United States Patent [19]

Marchese

[11] Patent Number: 5,738,578
[45] Date of Patent: Apr. 14, 1998

[54] MODULAR FOOD PROCESSING ASSEMBLY

[75] Inventor: Jerry J. Marchese, Oakbrook, Ill.

[73] Assignee: Mister Tenderizer, Inc., Chicago, Ill.

[21] Appl. No.: 728,335

[22] Filed: Oct. 9, 1996

Related U.S. Application Data

[63] Continuation of Ser. No. 591,110, Jan. 25, 1996, abandoned, which is a continuation of Ser. No. 235,683, Apr. 29, 1994, abandoned, which is a continuation-in-part of Ser. No. 143,918, Oct. 27, 1993.

[51] Int. Cl.$^6$ .................................................. A22C 9/00
[52] U.S. Cl. ............................................................ 452/142
[58] Field of Search .................................. 452/142, 141; 83/341

[56] References Cited

U.S. PATENT DOCUMENTS

| | | |
|---|---|---|
| 7,735 | 10/1850 | Staff. |
| 24,831 | 7/1859 | Storer. |
| 39,074 | 6/1863 | Smith ........................................ 83/341 |
| 108,021 | 10/1870 | Harvey et al. . |
| 116,166 | 6/1871 | Dennison. |
| 168,602 | 10/1875 | Billington. |
| 198,974 | 1/1878 | Fuller. |
| 440,635 | 11/1890 | Hunter ........................................ 452/142 |
| 446,485 | 2/1891 | Tyson. |
| 611,789 | 10/1898 | Milne et al. ................................ 452/142 |
| 625,739 | 5/1899 | Buerk ........................................ 452/142 |
| 824,319 | 6/1906 | Tolen et al. . |
| 1,631,869 | 6/1927 | Jurey ........................................ 452/142 |
| 1,635,053 | 7/1927 | Myers ........................................ 452/142 |
| 1,639,854 | 8/1927 | McBride. |
| 1,991,439 | 2/1935 | Wood. |
| 2,135,960 | 11/1938 | Campbell. |
| 2,153,013 | 4/1939 | Ungar ........................................ 83/341 |
| 2,302,398 | 11/1942 | Spang ........................................ 452/142 |
| 2,453,334 | 11/1948 | Morgan. |
| 4,085,482 | 4/1978 | Charron. |
| 4,672,716 | 6/1987 | Dickey ........................................ 452/142 |
| 4,943,341 | 7/1990 | Mattei ........................................ 83/341 |

*Primary Examiner*—Willis Little
*Attorney, Agent, or Firm*—Banner & Witcoff, Ltd.

[57] ABSTRACT

The modular food processing assembly includes a rigid support frame, and two elongated horizontally oriented generally cylindrical rollers being rotatably supported by the frame. The rollers may be provided with a plurality of serrated teeth or compatible ribs and grooves distributed radially and axially about the surface of the rollers, and the rollers are oriented generally parallel to each other. A hand crank is frictionally and removably connected to an end of a roller. Unified translation and compression means or gears connect the rollers proximate the ends of the rollers translating rotation of the hand crank into rotation of the two rollers and farther causing the rollers to be compressed against the food being processed. A clamp assembly is also included which is adapted to secure the frame to a fixed base, whereby when the hand crank is rotated, the food passes through the rotating rollers and becomes processed.

6 Claims, 6 Drawing Sheets

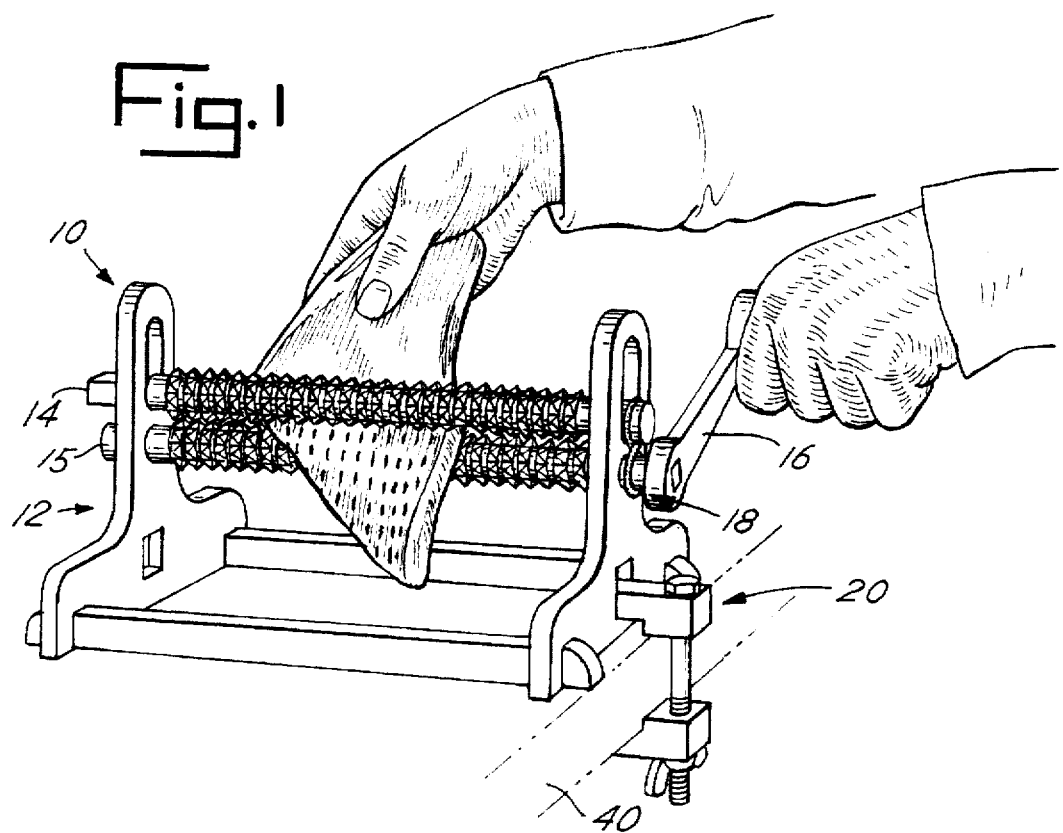
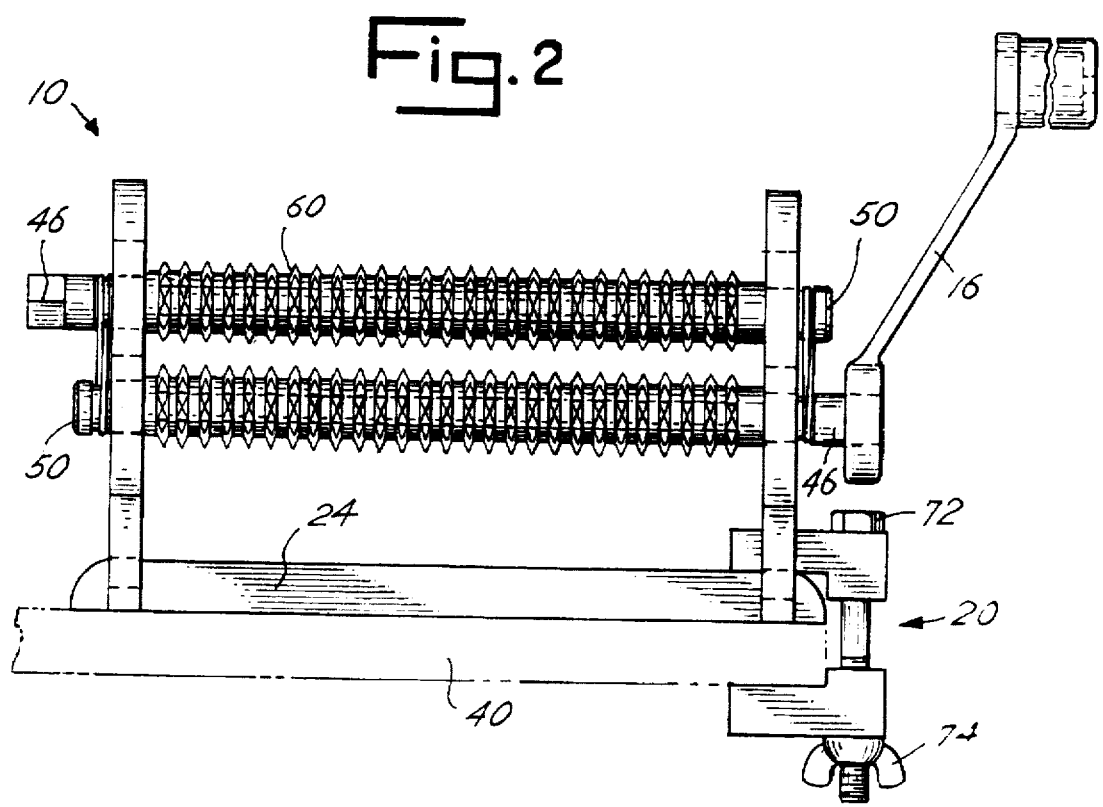

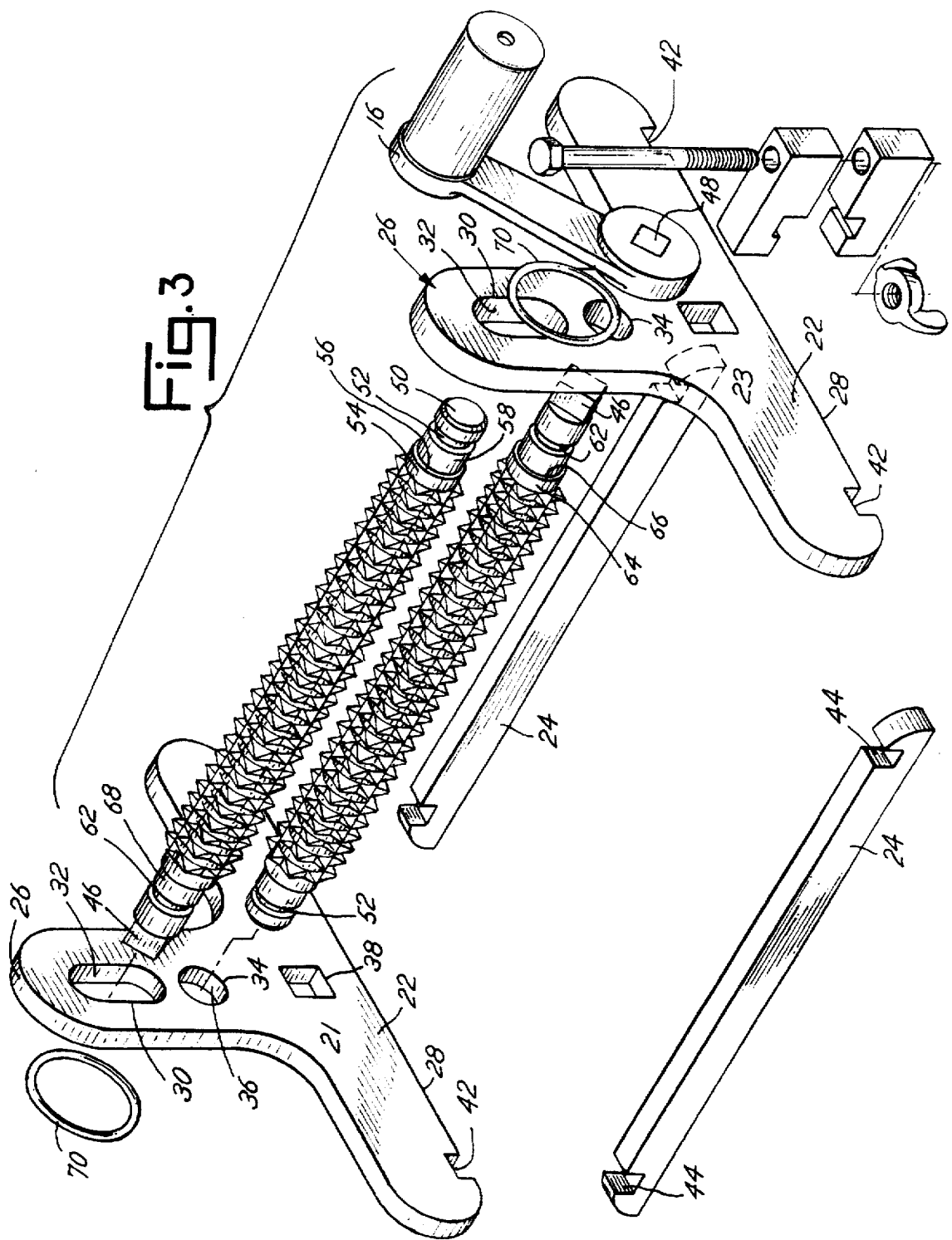

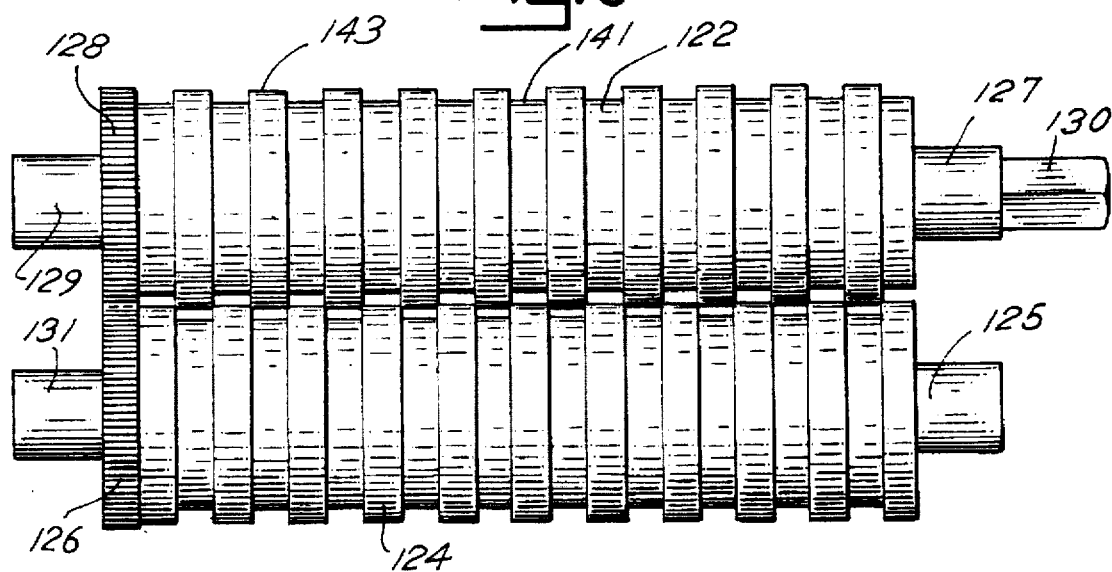
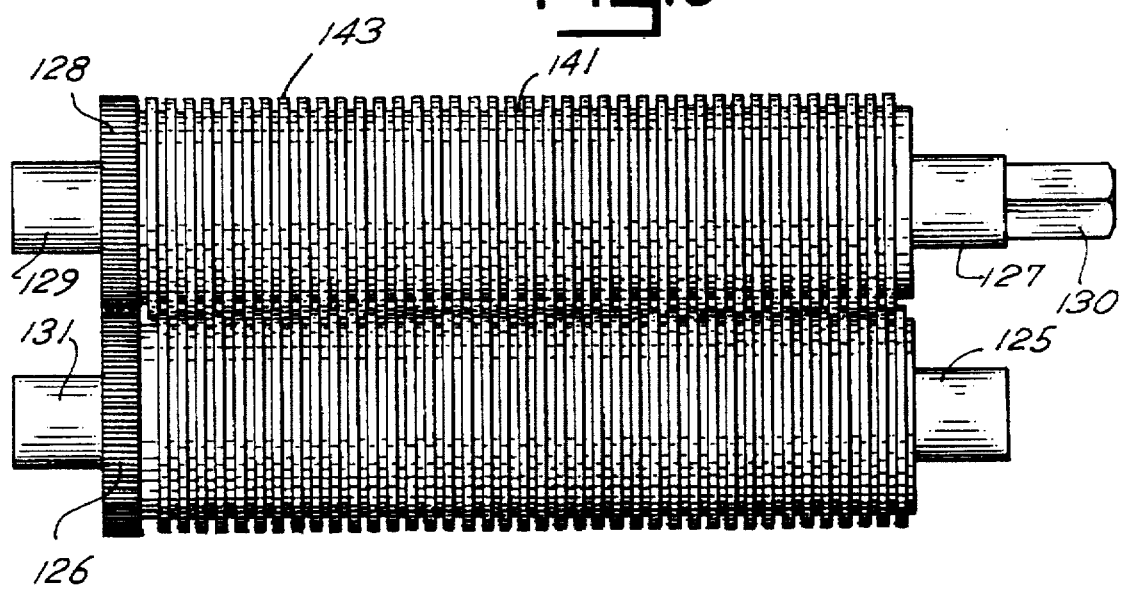

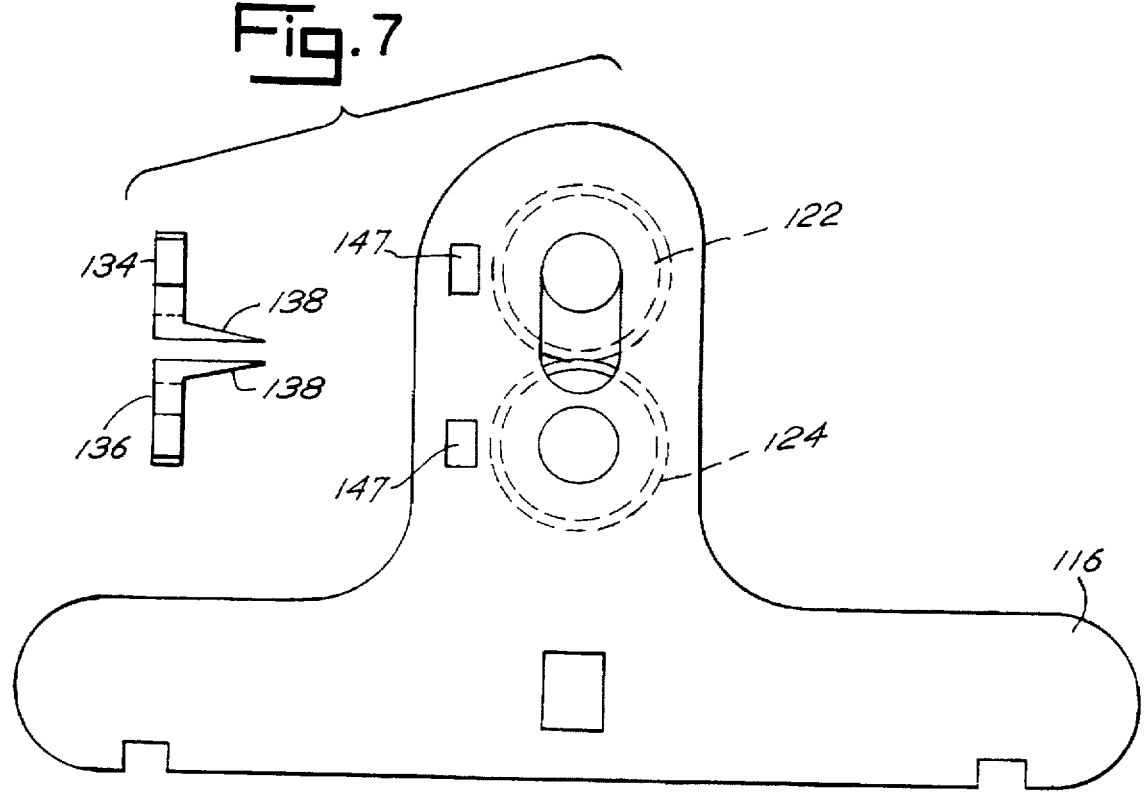
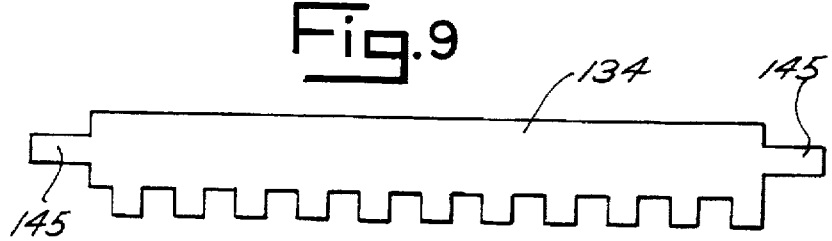
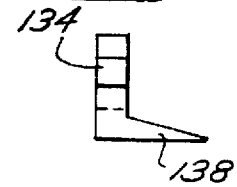
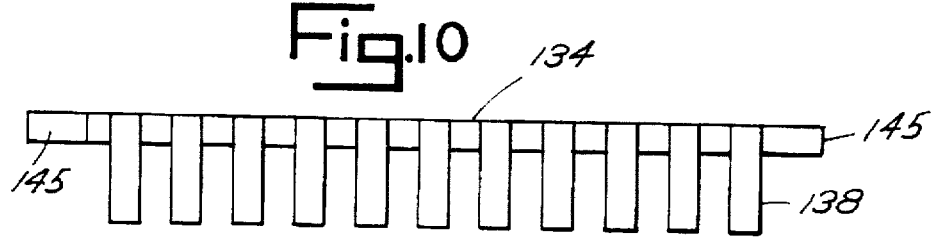

MODULAR FOOD PROCESSING ASSEMBLY

CROSS REFERENCE TO RELATED APPLICATION

This application is a file-wrapper continuation of application Ser. No. 08/591,110, filed Jan. 25, 1996 now abandoned, which is a continuation of application Ser. No. 08/235,683, filed Apr. 29, 1994, now abandoned, which is a continuation-in-part application to U.S. Ser. No. 08/143,918 filed Oct. 27, 1993 for Modular Food Processing Assembly for which priority is claimed.

1. Field of the Invention

The present invention relates to devices and methods used for the processing of food. More specifically, this invention relates to devices for the tenderizing of meats, as well as other food, that utilize serrated rollers to condition the food before cooking and to devices for otherwise conditioning and forming food products such as pasta products.

2. Background of the Invention

Cooks have used a variety of devices to process foods of all types over the years. For example, it has long been recognized that tenderized meat tastes better, cooks easier and faster, and absorbs seasonings and aromatic spices better than untenderized meat. Various devices and methods for tenderizing meat are well known in the art. Mallets have long been used in the art to tenderize meat but have the drawbacks of destroying the texture of the meat and causing great mess through splattered particles. Chemical tenderizers are used such as Mono Sodium Glutamate (MSG) but these have the drawbacks of frequently changing the flavor of the meat and generating potential health risks to some.

Another class of tenderizing devices has developed over time that utilizes a pair of rollers having serrated teeth through which the meat is passed. The teeth penetrate the surface of the meat, bruising the meat fibers, and thus, condition the meat. Such devices can be traced back to at least 1850 and U.S. Pat. No. 7,735 to Stagg.

A primary consideration when tenderizing meat is the need to apply a regulated force to the utensil contacting the meat, in order to achieve enough pressure to penetrate the meat's surface. Devices employing a hinged construction that allow the user to apply a direct manual pressure are commonplace. So too are devices using a variety of spring systems. However, these devices are generally complicated, or do not permit application of uniform pressure to the meat.

Another consideration is how to best move the meat through the rollers. Two systems have developed over time. The first system utilizes a single driven roller directly connected to a hand crank, relying on the pressure between the meat and the second roller to cause rotation and thus, tenderization by the second roller. These devices do not operate easily as only one roller is being directly rotated, and also do not provide satisfactory tenderization. The second system utilizes one directly driven roller, and a second roller indirectly driven by a gearing mechanism attached to the first roller. These devices provide better tenderization, but are more complicated in structure, and still must be adapted to solve the pressure consideration discussed above, making them even more complicated.

Over the years, these tenderizing devices evolved and became more sophisticated, employing combinations of various springs, gears and motors, with more working parts to potentially break down. Of course, being a product to be used with food, cleaning of the device is a consideration, and as the devices became more complex, so has cleaning of the products. So too as these meat tenderizing devices have become more complex, assembling the devices or repairing the devices has grown in complexity.

Of course, these considerations focus on tenderizing meat. Other foods need processing before cooking and, generally, require separate utensils or devices for their processing. For example, it is now popular to prepare homemade pasta. This trend has spurred the development and sale of a variety of pasta making machines for home use. Other devices for chopping, shredding, mashing, etc. are also available for the home cook, but again are offered as separate appliances.

SUMMARY OF THE INVENTION

It is therefore an object of the present invention to provide a food processing assembly of simplified construction, that is capable of processing a variety of foods.

A further object of this invention is to provide a food processing assembly that automatically provides a uniform pressure to serrated rollers for processing the food through a simple mechanism.

Another object of this invention is to provide a food processing assembly that moves food through serrated rollers through use of a simple mechanism.

An additional object of this invention is to provide a food processing assembly that is simple to manufacture and assemble and allows for easy clean up.

To accomplish these objects, the food processing assembly of the present invention comprises, a rigid support frame, two elongated horizontally oriented generally cylindrical rollers being rotatably supported by the frame, the rollers in one embodiment having a plurality of serrated teeth distributed radially and axially about the surface of the rollers, and the rollers further being oriented generally parallel to each other, a hand crank frictionally and removably connected to an end of a roller, unified translation and compression means connecting the rollers proximate the ends of the rollers translating rotation of the hand crank into rotation of the two rollers and further causing the rollers to be compressed against the food being processed, and a damp assembly adapted to secure the frame to a fixed base, whereby when the hand crank is rotated, the food passes through the rotating rollers and becomes processed.

An alternative embodiment of the invention utilizes first and second parallel axis rollers with complementary patterned surfaces on each of the rollers that act in conjunction and, therefore, are compatible with one another. In combination with the rollers are rakes positioned at the exit pathway through the rollers. The rakes are designed to separate the product from the rollers processed by actuation of the rollers and simultaneously maintain the rollers properly separated and positioned relative to one another. Various patterns of rollers may be utilized in combination with appropriate rakes. The entire assembly may be exchanged with the rollers maintained in the rigid support frame of the embodiment first referenced above.

Other objects and advantages of the invention will become apparent from the following description of the invention.

BRIEF DESCRIPTION OF THE DRAWING

In the detailed description that follows, reference will be made to the drawing comprised of the following figures:

FIG. 1 is an isometric view of a modular food processing assembly of this invention while in use;

FIG. 2 is a from view of the modular food processing assembly of FIG. 1;

FIG. 3 is an exploded isometric view of the modular food processing assembly of FIG. 1;

FIG. 5 is a plan view of a first set of pasta rollers utilized in combination with the embodiment of FIG. 4;

FIG. 6 shows an alternative roller construction utilized for making thin spaghetti or linguini pasta;

FIG. 7 is a side elevation of the frame which is utilized in combination with rollers of the type shown in FIGS. 4 and 5 and further depicting the position of special food removal rakes for use in combination with the food processing rollers;

FIG. 8 is an enlarged side view of the rake utilized in the combination depicted in FIG. 6;

FIG. 9 is a front view of the rake of FIG. 8;

FIG. 10 is a bottom view of the rake of FIG. 8;

DESCRIPTION OF THE PREFERRED EMBODIMENT

Figure 4:
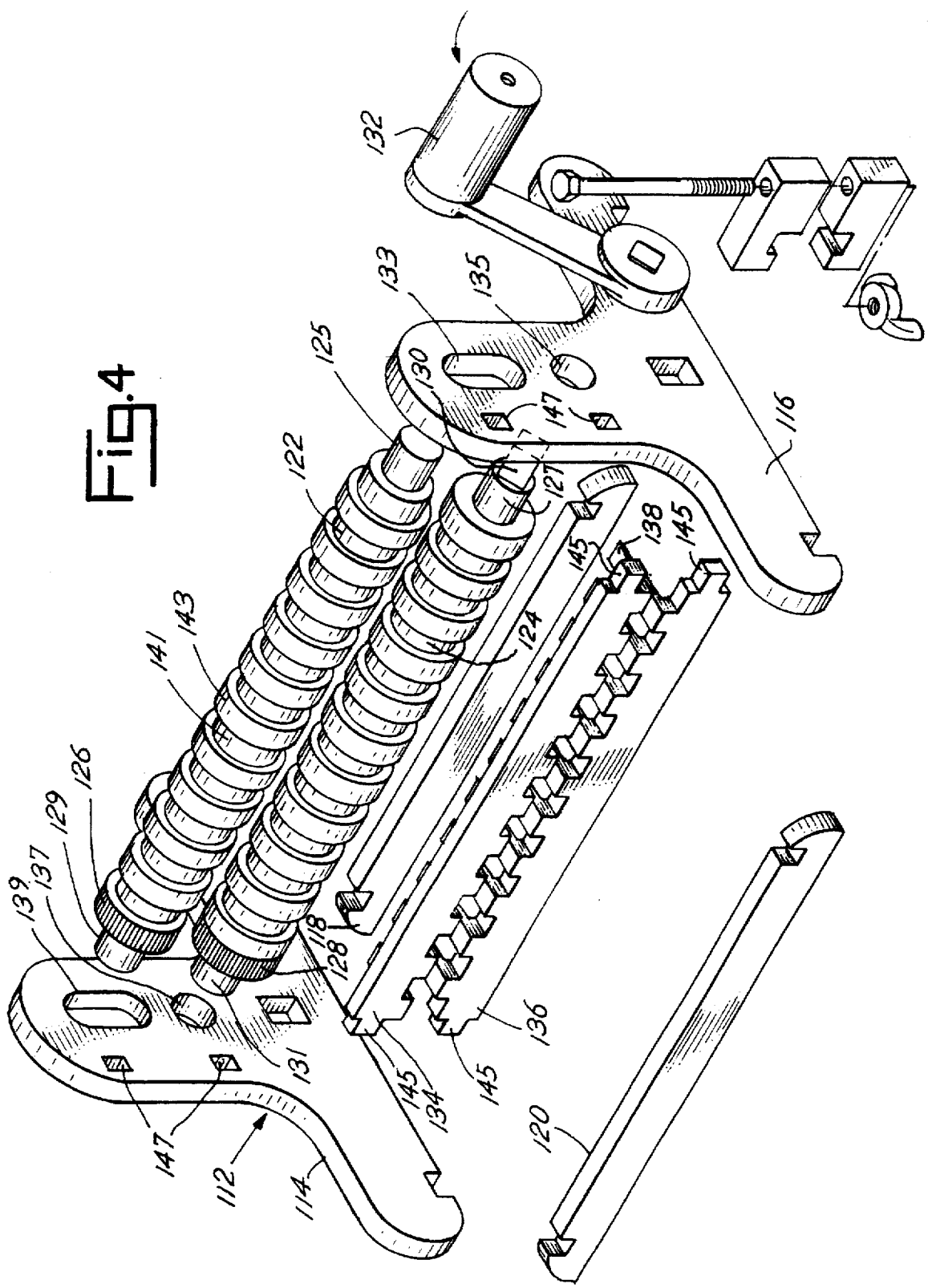
FIG. 4 is an isometric view of a second alternative embodiment of a modular food processing assembly of the invention wherein the rollers are cooperative with one another by virtue of a gear associated with each roller at one end thereof and special rakes.

Referring to FIGS. 1 to 3, a modular food processing assembly 10 of the present invention is shown. In particular, the pictured assembly 10 is adapted to tenderize meat; however, the modular components of the food processing assembly may be switched to carry out a variety of other food processing as discussed below. As can be seen in FIG. 3, the modular meat tenderizing assembly 10 is of a simple construction, requiring a minimum number of components to assemble and operate.

Turning back to FIGS. 1 and 2, the modular meat tenderizing assembly 10 is comprised of support frame 12, upper roller 14, lower roller 15, crank 16, unified translation and compression means 18, and damp assembly 20. As will be described below, these components are removably connected when the assembly 10 is in use, allowing the assembly 10 to be disassembled easily by the user after use.

Referring again to FIG. 3, the support frame 12, is comprised of two vertically oriented, generally planar end plates 22, and two thin elongated cross members 24. Each end plate 22 and cross member 24 is preferably an integrally molded unit, made of high density polyethylene, or similar material that meets all USDA and FDA standards for food handling equipment.

End plate 22 contains a roller end 26, and a base end 28 vertically distant from the roller end 26. As depicted in FIG. 3, roller end 26 is located above base end 28. Each end plate 22 has two planar surfaces, an inside surface 21 and an outside surface 23. Proximate roller end 26, end plate 22 contains vertically extended slot 30. Slot 30 defines an extended internal shoulder 32 in end plate 22, the shoulder being rounded on each end such that it may rotatably support upper roller 14 as described in detail below.

Vertically spaced from extended slot 30 in the direction of base end 28 is opening 34 in end plate 22. Opening 34 is generally circular in shape, and also defines an internal shoulder 36 in end plate 22. Internal shoulder 36 acts as a bearing surface for lower roller 15 as discussed below.

Proximate base end 28 of end plate 22 is clamp slot 38. Clamp slot 38 defines an opening in end plate 22 that cooperates with clamp assembly 20 to secure the support frame 12 to an appropriate fixed base 40 such as a table or counter top.

Horizontally spaced from clamp slot 38 and proximate base end 28 of end plate 22 are lower notches 42. Lower notches 42 are shown generally rectangular in shape, though this is not a limitation of the invention. Lower notches 42 must be configured to releasably and frictionally connect with complementary upper notches 44 of cross member 24. Similarly, the exact locations of lower notches 42 and upper notches 44 are not crucial. What is significant is that the connections between lower notches 42 of end plates 22 and upper notches 44 of cross members 24 be tight enough to form a relatively rigid frame 12 to support upper roller 14 and lower roller 15 when the assembly 10 is in use, but also allow the frame 12 to be easily disassembled after use.

As shown in FIG. 3, an upper notch 44 is provided in the upper surface of cross member 24, proximate each end. When the frame 12 is assembled for use as in FIGS. 1 and 2, cross members 24 act to support end plates 22 vertically and thus keep frame 12 in the vertically oriented position, while also laterally spacing end plates 22 from each other to accommodate rollers 14 and 15.

Rollers 14 and 15 are elongated and generally cylindrical in cross section, having a length approximately equal to cross members 24. Rollers 14 and 15 have two ends, a crank end 46, suitably shaped to releasably and frictionally fit with complementary orifice 48 of crank 16, and distal end 50 axially distant from crank end 46. Proximate distal end 50, each roller 14 and 15 is provided with circumferential groove 52. Axially spaced from groove 52 in the direction of crank end 46 is distal collar 54. Distal collar 54 is of a greater diameter than extended slot 30 of end plate 22, thus defining annular lip 56. Between circumferential groove 52 and annular lip 56, rollers 14 and 15 define bearing surface 58, having a diameter slightly smaller than extended slot 30 of end plate 22.

Proximate crank end 46, each roller 14 and 15 is provided with second circumferential groove 62. Axially spaced from groove 62 in the direction of distal end 50 is second collar 64. Second collar 64 is of a greater diameter than extended slot 30 of end plate 22, thus defining second annular lip 66. Between second circumferential groove 62 and second annular lip 66, rollers 14 and 15 define second bearing surface 68, having a diameter slightly smaller than extended slot 30 of end plate 22.

As can be most easily seen in FIG. 2, between annular lip 56 and second annular lip 66, a plurality of serrated teeth 60 are distributed radially and axially about the surface of rollers 14 and 15. Teeth 60 may be pyramidal, conical or other sharpened shape that permits the teeth to penetrate the surface of the meat when force is exerted on the rollers 14 and 15.

To operate the modular meat tenderizing assembly 10, a user will typically begin with the components of the assembly 10 disassembled and stored in a kitchen drawer, or dedicated storage container (not shown) that may be provided with the assembly 10. Crank end 46 of upper roller 14 is inserted through extended slot 30 of one end plate 22 until second annular lip 66 of roller 14 comes in contact with inside surface 21 of end plate 22.

Next, the user will place distal end 50 of lower roller 15 through circular opening 34 of end plate 22, until annular lip 56 of lower roller 15 contacts inside surface 21 of end plate 22. These two steps are repeated with distal end 50 of upper roller 14 to crank end 46 of upper roller 14, respectively, and the other end plate 22. The two rollers 14 and 15 are now aligned horizontally and parallel to each other, with a small elongated space S (shown in FIG. 2) existing between the rollers 14 and 15.

Base ends 28 of end plates 22 are then secured to lateral members 24 by sliding lower notches 42 into upper notches 44. In this manner, a rigid support frame 12 for the rollers 14 and 15 has been created in which the members are frictionally and releasably secured to one another.

After the rigid frame 12 has been set up, upper roller 14 will be rotatably and releasably connected to end plates 22 through the contact of bearing surfaces 58 and 68 of upper roller 14 on extended shoulder 32 of slot 30 in each end plate. Similarly, lower roller 15 will be free to rotate in end plate 22 through the contact of bearing surfaces 68 and 58 of lower roller 15 on internal shoulder 36 of opening 34.

Next an elastomeric o-ring 70 is placed in the grooves 62 and 52 of upper roller 14 and lower roller 15, respectively. The o-ring 70 is crossed over in a "figure eight" fashion as shown in FIGS. 1 and 2. A second o-ring 70 is placed in grooves 52 and 62 of upper roller 14 and lower roller 15 in a similar manner. Following assembly of the frame 12 and addition of the o-rings 70, the grooves 52 and 62 and the o-rings 70 will be located proximate the outside surface of each end plate 22.

The hand crank 16 is then connected to the frame 12 by sliding orifice 48 of crank 16 over crank end 46 of lower roller 15. Again, as with the components of the frame 12, the crank 16 is held in place on lower roller 15 by a tight frictional fit between the orifice 48 and crank end 46. Finally, clamp assembly 20 is attached to the frame 12 to secure the frame to fixed base 40 by passing a portion of the clamp assembly 20 through clamp slot 38 in end plate 22 in the manner well known in the art. The clamp assembly 20 can take the form of a bolt 72 and wing nut 74 assembly as depicted in FIGS. 1 to 3, or an equivalent assembly that is simple to use.

As shown in FIG. 1, after the entire assembly 10 has been constructed, a piece of meat is placed in the space S between upper roller 14 and lower roller 15. When the meat is placed in contact with the rollers, hand crank 16 is manually rotated to begin the process of tenderizing the meat. As hand crank 16 is rotated, lower roller 15 rotates in the same direction due to its direct connection to the crank through orifice 48. The rotation of lower roller 14 causes each of the o-rings 70 seated in grooves 52 and 62 of lower roller 14 to move. Due to the o-ring cross over previously described, the o-rings 70 act as an endless belt translating the rotational movement of lower roller 14 into rotational movement of upper roller 15 in the opposite direction, because the o-rings are also seated in grooves 62 and 52 of upper roller 15.

As the rollers 14 and 15 rotate, they draw the meat through the rollers and into contact with the serrated teeth 60 on the rollers. Furthermore, as the meat passes between the rollers, upper roller 15 is forced upward in extended slot 30 of each end plate 22 due to the thickness of the meat. However, the elasticity of the o-rings 70 provides a counterforce to this movement, causing the upper roller 14 to compress against the meat. Thus, the o-rings 70 serve as a unified means to translate motion of the rollers and also compress the rollers against the meat, providing the force necessary to penetrate the surface of the meat. When the meat has been passed through the rollers 14 and 15, the assembly 10 may be quickly disassembled, cleaned and stored.

As can now be seen, the modular meat tenderizing assembly of the present invention provides a simple device for tenderizing meat. The device is easily assembled and efficiently operated through rotation of the rollers 14 and 15 by o-rings 70. The desired degree of tenderness of the meat can be achieved by passing the meat through the rollers one or more times.

Of course, meat of a range of thicknesses may be used with the assembly 10, limited by the elastic characteristics of the o-rings 70. Moreover, the thickness of the meat tenderized by the assembly 10 can be greatly varied by providing a variety of larger and smaller o-rings 70 for use with the assembly 10. As larger o-rings are used, larger cuts of meat may be passed between the rollers.

Due to the modular nature of the assembly 10, the assembly may be disassembled and stored in a limited amount of space, such as in cabinets or drawers, and may also be easily cleaned in a dishwasher. Furthermore, as can be seen in FIG. 3, the modular nature of the assembly 10 allows for easy and inexpensive manufacture of the assembly since each end plate 22 may be identical, each cross member 24 may be identical and each roller 14 and 15 may be identical.

As noted above, the modular assembly 10 may be used to process food other than meats. For example, the serrated rollers 14 and 15 may be exchanged for other specialized rollers (not shown) for making pasta. These pasta rollers could be adapted to fit and work in the assembly in the same manner as the serrated rollers, thus requiring the additional purchase of only the pasta rollers. Similarly, the serrated rollers 14 and 15 may be used for food processing other than meat, and may also be utilized in a different modular frame. It is readily apparent that the modular nature of the food processing assembly allows for a multitude of potential configurations and uses.

FIGS. 5 through 13 illustrate a construction of an embodiment of the invention wherein various types of food processing rollers such as pasta rollers and associated rakes are utilized in combination with a frame of the type generally described heretofore. Referring to those figures and more particularly FIGS. 4 and 7, a frame 112 is comprised of first and second substantially identical end plates 114 and 116. The end plates are connected together by means of cross members 118 and 120 which coact with the base of the end plates 114 and 116 in the manner previously described for the embodiment of FIGS. 1-3. Food processing rollers such as pasta rollers 122 and 124 have a generally cylindrical shape with a hub 125, 127, 129, 131 at each end thereof projecting through compatible passages or openings 133, 135, 137, 139 in the end plates 114 and 116. The rollers 122 and 124 each include a circumferential, integral gear 126 and 128, respectively, which interacts or meshes so that the rollers 120 and 122 will rotate in unison. One of the rollers 124 is a driven roller and includes a keyed end 130 which coacts with a handle 132 so that upon rotation of the handle 132, the roller 124 is rotated and the roller 122 is simultaneously driven due to interaction of gears 126, 128. In this manner the rollers 122, 124 will rotate in unison in the appropriate direction.

Rakes 134 and 136 are positioned at the outlet side of the rollers 122 and 124. The rakes 134, 136, which are depicted in greater detail in FIGS. 8, 9 and 10, include projecting, spaced teeth 138 that are compatibly sized and aligned with grooves 141 between ribs 143 as discussed below. The rakes 134 and 136 are thus held in position by cooperation of mounting lugs 145 which fit through openings 147 defined in the end plates 114 and 116. In this manner, the rakes 134 and 136 may be easily inserted, removed, cleaned and replaced depending upon the size of the rake that is needed and the necessity to have the rake compatible with the rollers.

The rakes serve to keep the food product from clinging to the rollers 122, 124. Note that the rakes 134, 136 have a secondary function of supporting and separating the rollers 122, 124 so that the opposed ribs 143 and grooves 141 of rollers 122, 124 remain properly spaced. That is, the teeth 138 fit into grooves 141 of the respective rollers 122, 124, thereby supporting the rollers 122, 124 and particularly roller 122 in passages 133, 139. The rakes 134, 136 are thus mounted in openings 147 so as to insure proper positioning and alignment of rollers 122, 124. Note also that the rollers 122, 124 are sized and include hubs 125, 127, 129, 131 that are sized so that the rollers may be rotated, yet properly spaced and also supported with roller 122 having its hubs 125, 129 against the top of slots 133, 139. Proper dimensioning of the component parts is therefore important especially the dimensioning of the rollers 122, 124, their ribs and grooves 141, 143 and the rakes 134, 136 as well as the teeth 138 and the position of openings 147 for the rakes 134, 136.

The rollers, such as pasta rollers 122 and 124 may be of any of a variety of surface shapes and configurations. In the embodiments depicted in FIGS. 4, 5 and 6, the rollers are comprised of a series of ribs or ridges 143 and grooves 141 which interact or intermesh and are compatibly sized. In this manner, when processing pasta, for example, by means of the device of the invention, it is possible to provide strips of pasta created by feeding a flat or generally kneaded amount of dough between the rollers 122 and 124. The handle 132 is thus turned in the appropriate direction to feed the dough between those rollers 122, 124. The grooves 141 of the rollers 122, 124 intermesh with ridges 143 and are appropriately spaced therefrom as depicted in FIG. 5, for example, so that strips of processed food are formed and are caused to be ejected between the rakes 134, 136 having teeth 138 which fit within the grooves 141 associated with the respective rollers 122 and 124.

Figure 11:
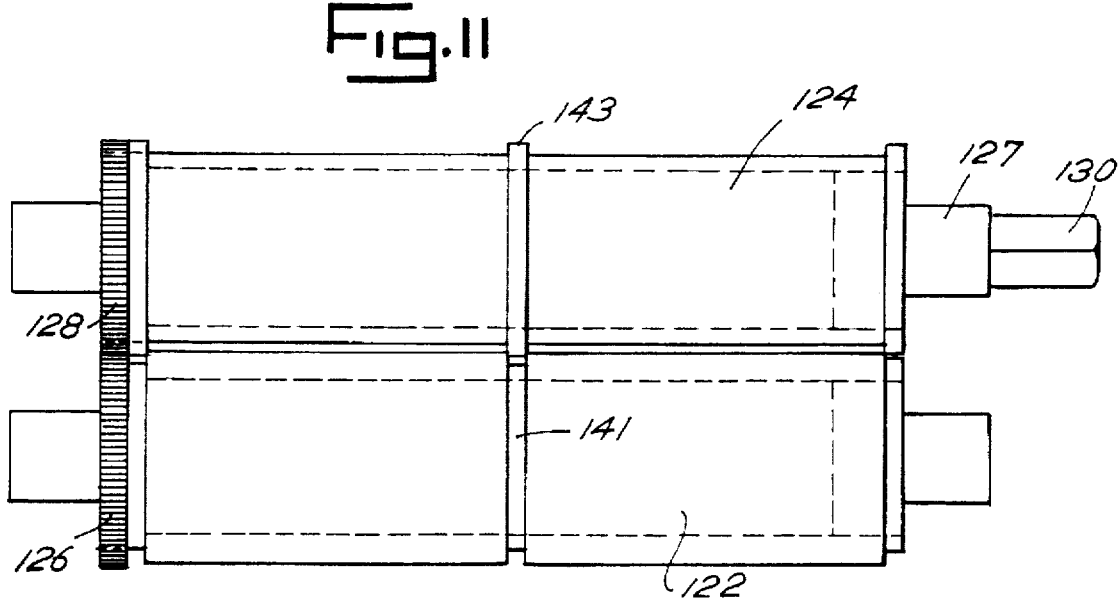
FIG. 11 a plan view of yet another set of rollers which may be used to make elongated strips of processed food.
Figure 12:
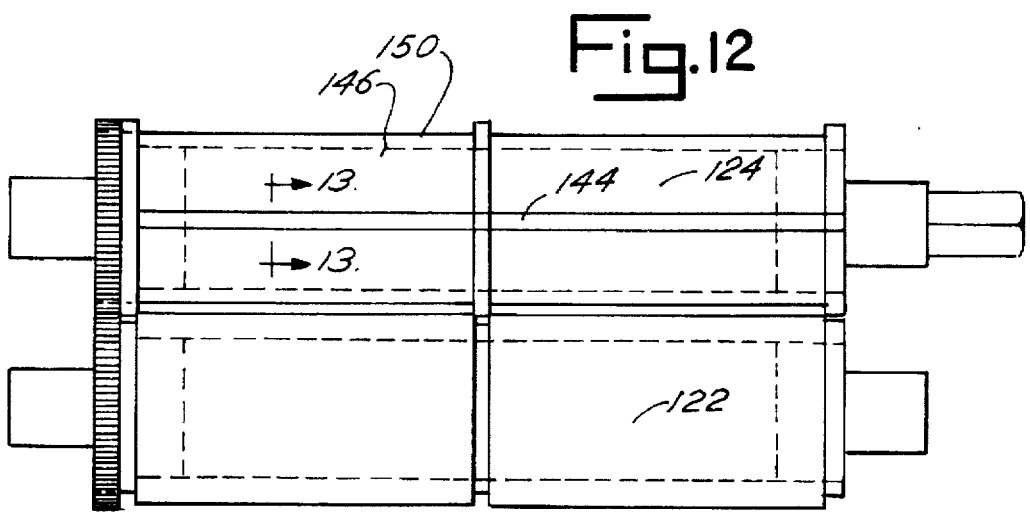
FIG. 12 is another top plan view of a pair of rollers which are utilized to manufacture squares or rectangular shapes of processed food.
Figure 13:
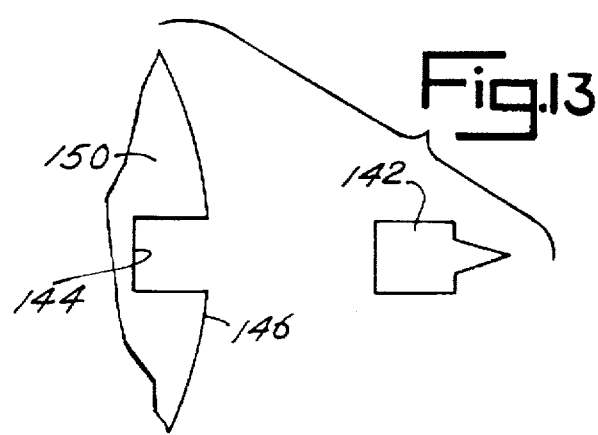
FIG. 13 is an enlarged cross sectional view the construction of an insert which may be incorporated in a roller utilized to effect transverse cuts in the processed food.

FIG. 5 discloses a pair of rollers which are designed to form a noodle shaped pasta such as a fettucini. FIG. 6 depicts compatible rollers which are designed to form a spaghetti or linguini. In each event, specific rakes compatibly configured with the rollers are provided and may be inserted and replaced between the end plates 114 and 116. FIG. 11 depicts a pair of rollers which are provided to process large sheets of pasta. A great variety of cooperating grooves and ribs may be utilized for the rollers to provide a great variety of desired shapes of processed food. FIGS. 12 and 13 depict a special construction of rollers which includes a lateral blade in the surface thereof so that the processed food will be periodically cut into finite lengths as the rollers are rotated. This is effected by inserting a preformed blade 142 into a groove 144 defined in the surface 146 of a roller 150. Then as the roller 150 rotates toward the opposite roller 151, processed food passing therebetween will be laterally or transversely cut by means of the blade 142. Such a construction is useful for making ravioli squares.

Numerous alternative roller constructions may be utilized. Utilization of intermeshing gears in order to cause the rollers to compatibly mesh and move may be substituted in place of other interconnecting drive mechanisms such as described with respect to the first embodiment above. In any event, the simplified construction described herein may include numerous other alternative constructions.

Although exemplary embodiments of the invention have been shown and described, many changes and substitutions may be made by persons of ordinary skill in the art without departing from the scope of the invention. This invention therefore includes alternatives to the specific configurations described in the exemplary embodiments and is limited only by the language of the claims.

What is claimed is:

1. A modular food processing assembly including means for switching the assembly for use in at least two configurations, the first configuration being belt driven and the second configuration being gear driven, comprising, in combination: a vertically oriented rigid support frame including opposed support plates, each support plate having a vertically extended slot defining an extended internal shoulder in the end plate, and further having a generally circular opening defining a second internal shoulder in the end plate vertically spaced from the extended internal shoulder; at least two elongated horizontally oriented generally cylindrical rollers being rotatably and releasably supported by the plates proximate the ends of the rollers, the rollers further being oriented generally parallel to each other; a hand crank frictionally and removably connected to an end of one of the rollers for translating rotation of the crank into rotation of the rollers; the rollers being connected proximate the ends of the rollers in the first configuration by unified translation and compression means, and in the second configuration by engaged gears, said switching means comprising bearing surfaces on the rollers in both configurations proximate the ends of the rollers, the bearing surfaces having a diameter smaller than the extended slot in the support plate, the roller in the extended slot being movable while it is seated therein in the vertical direction relative to the roller in the circular opening.

2. The modular food processing assembly of claim 1 wherein a roller has a bearing surface proximate the end of the roller, the bearing surface of the roller rotatably contacting the bottom of the extended internal shoulder in the first configuration, and the bearing surface of the roller rotatably contacting the top of the extended internal shoulder in the second configuration.

3. The modular food processing assembly of claim 2 wherein the rigid support frame further comprises two vertically oriented, generally planar end plates having an inside surface and an outside surface opposite the inside surface and two thin elongated cross members frictionally and releasably secured to the end plates proximate the base end permitting the end plates to be laterally spaced from each other to accommodate the rollers.

4. The modular food processing assembly of claim 3 wherein the end plates and cross members are frictionally and releasably secured to each other by the contact of notches on the end plates proximate the base end and complimentary notches on the cross member, creating a rigid frame when the assembly is in use and permitting the frame to be easily disassembled when not in use.

5. The modular food processing assembly of claim 2 wherein each roller is provided with at least one circumferential groove and at least one circumferential rib coacting with and spaced from the groove of the opposed roller for processing food passing between the rollers.

6. The assembly of claim 1 including a transverse cutting member mounted on the surface of one roller.

* * * * *

UNITED STATES PATENT AND TRADEMARK OFFICE
CERTIFICATE OF CORRECTION

PATENT NO. : 5,738,578

DATED : April 14, 1998

INVENTOR(S) : Marchese

It is certified that error appears in the above-indentified patent and that said Letters Patent is hereby corrected as shown below:

The Abstract of the patent reads "rollers and farther causing" and should read -- rollers and further causing--

Col. 2, ln. 39 reads "processed, and a damp" and should read -- processed, and a clamp--

Col. 2, ln. 66 reads "FIG. 2 is a from view" and should read -- FIG. 2 is a front view--

Signed and Sealed this

Twenty-third Day of June, 1998

Attest:

BRUCE LEHMAN

*Attesting Officer*          *Commissioner of Patents and Trademarks*